Aug. 2, 1927.

W. B. BRONANDER 1,637,801

TOBACCO STEMMING MECHANISM

Filed April 7, 1926    2 Sheets-Sheet 1

INVENTOR
Wilhelm B. Bronander
BY
Sydney Prescott
ATTORNEY

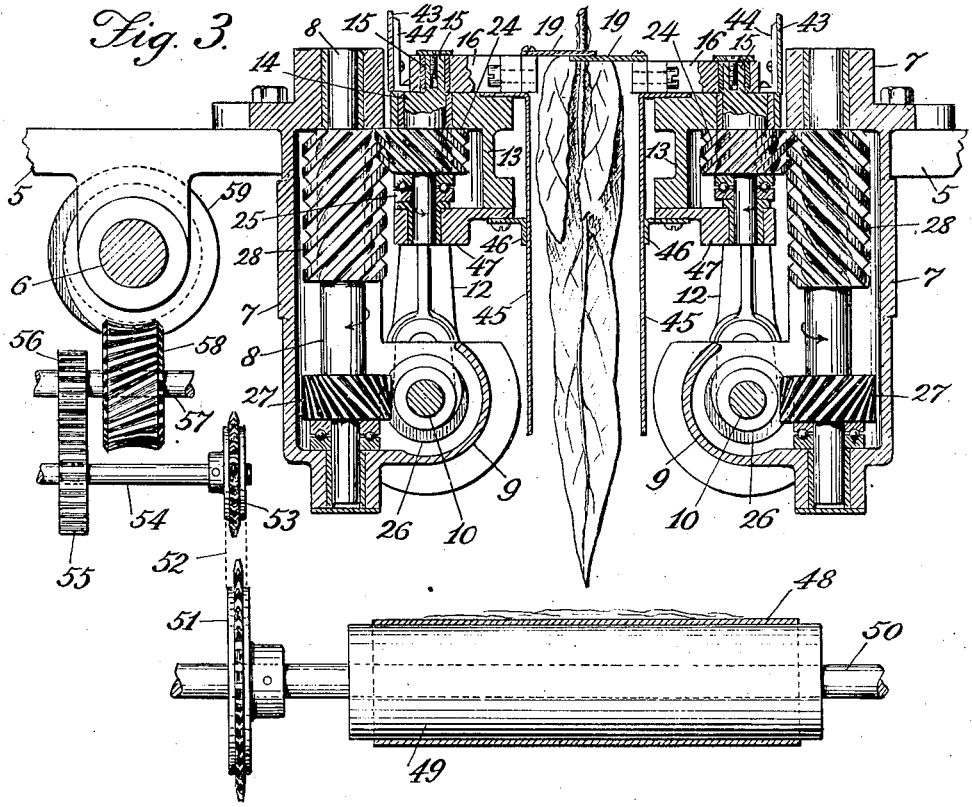

Patented Aug. 2, 1927.

1,637,801

UNITED STATES PATENT OFFICE.

WILHELM B. BRONANDER, OF MONTCLAIR, NEW JERSEY, ASSIGNOR TO STANDARD TOBACCO STEMMER COMPANY, A CORPORATION OF VIRGINIA.

TOBACCO-STEMMING MECHANISM.

Application filed April 7, 1926. Serial No. 100,362.

This invention relates to an improvement in a tobacco stemming mechanism for machines of the type disclosed in the Strickland Patent No. 1,301,193, granted Apr. 22, 1919, and for others.

In the Strickland tobacco stemming machine, or the standard stemmer as it is called in the industry, there are two circular series of multi-notched leaf-stripping blades rotating about axes substantially at right angles to the stems being drawn upwardly and forwardly between said series of blades. The blades of the two series alternately engage the stems and strip short sections of leaf therefrom; but each blade engages any given stem once only, for it spends the most of its time in traveling in an orbital path far away from the stems and then toward them. The blades are therefore idle the most of the time, although the two series as a whole are always at work on approximately as many leaves as there are blades.

It has now been discovered that a greater output at less expense, and cleaner strip, are obtainable by a change in such machines involving the use of only a single pair of leaf-stripping members, or blades of the multi-notched type, these members, or blades, engaging opposite sides of a stem at the same time and coacting to simultaneously strip a short section of the leaf from both sides of the stem, and having the smallest possible traveling movements toward and away from the stems, and repeatedly engaging the same stem as the latter is moved upwardly and forwardly between the members, or blades. The main object of the present invention, therefore, is the production of a tobacco stemming mehanism having these desirable characteristics. With this and other objects not specifically mentioned in view, the invention consists in certain combinations and constructions which will be hereinafter fully described and then specifically set forth in the claims hereunto appended.

Figure 1:
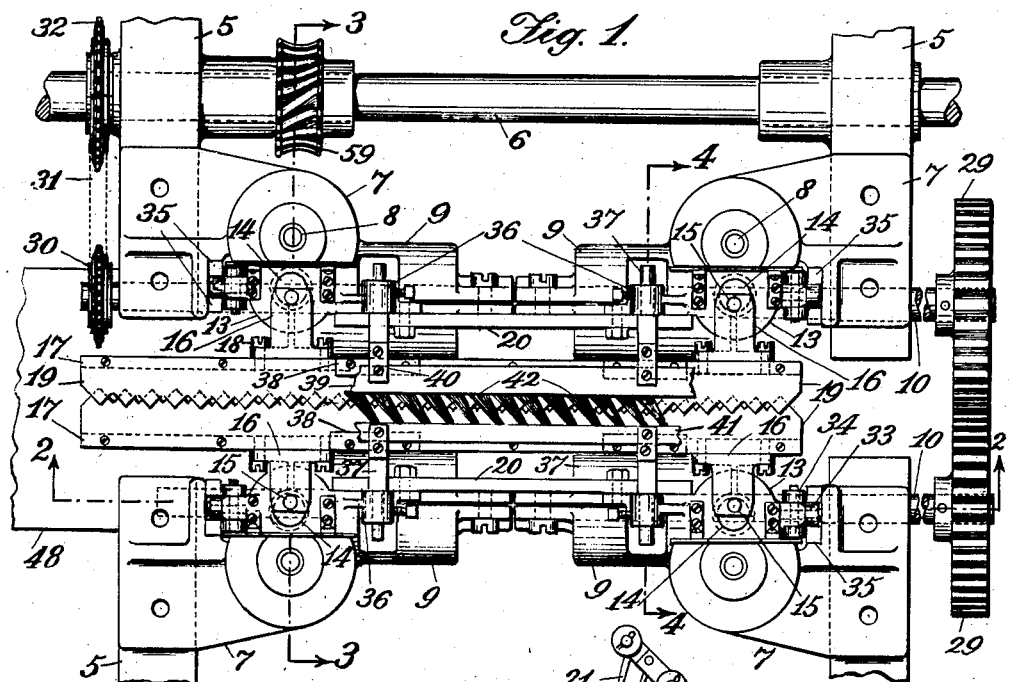
Figure 2:
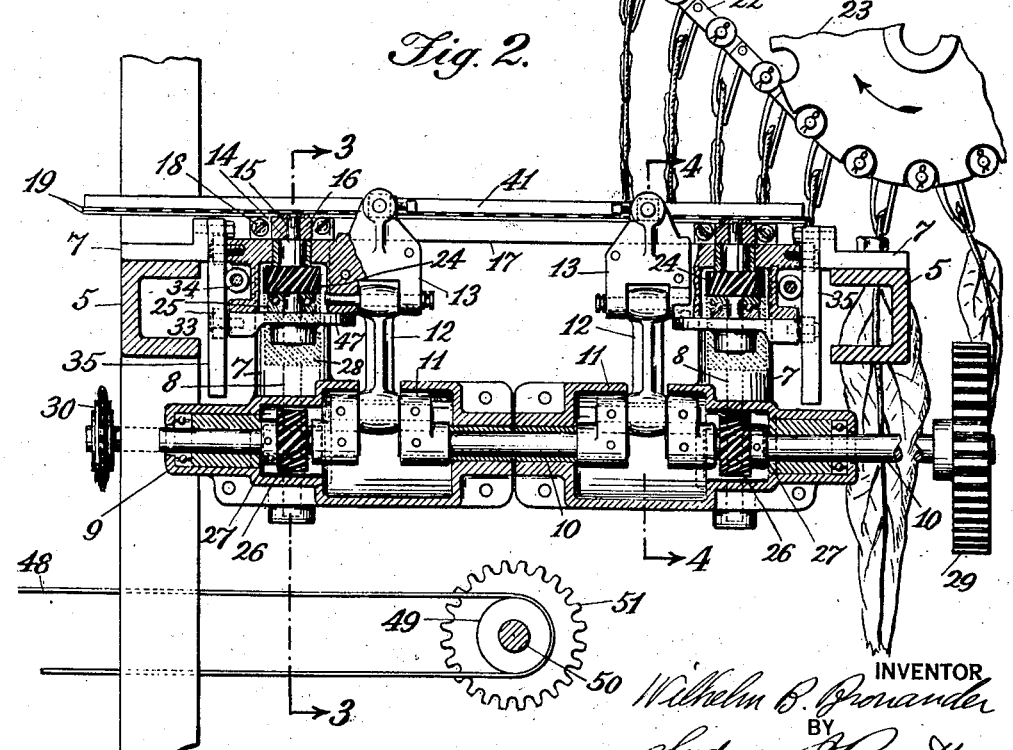

In the accompanying drawings, in which like characters of reference indicate the same or like parts, Fig. 1 is a plan view of a mechanism constructed in accordance with the invention; Fig. 2 is a sectional elevation taken on the line 2—2 in Fig. 1; Fig. 3 is a cross-sectional elevation taken on the line 3—3 in Fig. 1; and Fig. 4 is a cross-sectional elevation taken on the line 4—4 in Fig. 1.

In carrying the invention into effect, there are provided two coacting leaf-stripping members, means whereby a plurality of stems are simultaneously drawn between said members, and means for producing in rapid succession movements of said members which are the resultants of traveling movements around axes substantially parallel with the stems and of reciprocating movements along the stems to cause said members to repeatedly engage each stem and strip a short section of leaf therefrom, reducing to a minimum the time heretofore lost in moving such members far away from the stems and back again. In the best constructions contemplated, there is further provided means whereby the traveling movement of the leaf-stripping members is interrupted during the stripping reciprocating movement of said members, so that during this period the movement is straight along the stem instead of along an arc to which the stem is tangent as heretofore. The various means may be widely varied in construction within the scope of the claims, for the specific structure selected to illustrate the invention is but one of many possible concrete embodiments of the same. The invention, therefore, is not to be restricted to the precise details of the structure shown and described.

Referring to the drawings: On the cross members 5 of the frame of the machine in connection with which the mechanism is used, two of which members carry the drive shaft 6, are supported the bearings 7 in each of which is mounted a vertical transmission shaft 8 and each of which forms the stationary part 9 of one of the split supports for the crankshaft 10.

The crankshafts 10, by means of the cranks 11, operate the connecting rods 12, the latter being attached to the crossheads 13 in each of which is journaled a vertical crankshaft 14 having an upwardly projecting crank 15 passing through a hole near one end of the blade holders 16. To each of these holders a bar 17 is fastened by means of screws 18 passing through a flange at the other end of each holder, the bars 17 in turn carrying the leaf-stripping members or blades 19. Each two crossheads of the same blade are connected by means of a tie-bar 20.

The stripping blades 19 are multi-notched with saw-like teeth which, when moved together, form a series of holes, as shown in Fig. 1; and when the blades are in closed position they closely embrace the stems in said holes. The teeth of the blades are so spaced that the holes formed by them register with the grippers 21 of the chain 22 which runs upwardly and forwardly, the chain being driven by means of one of its sprockets 23 in a well known manner.

On each of the vertical crankshafts 14 in the crossheads 13 is fixed a short spiral gear 24 supported by a thrust bearing 25. On the horizontal crankshafts 10 are fixed the spiral gears 26 meshing with the spiral gears 27 on the transmission shafts 8 which carry the elongated spiral gears 28 meshing with the spiral gears 24 on the crankshafts 14. The crankshafts 10 are rotatably connected by means of the spur gears 29, one of the crankshafts 10 being driven by the sprocket 30 connected by chain 31 with the sprocket 32 on the main shaft 6.

The cranks 15 give the blades 19 short traveling movements around axes substantially parallel with the stems, repeatedly opening them to admit stems to the various notches as the stems advance and repeatedly closing them on the stems to permit the leaf-ripping action to occur. The crankshafts at the same time move the blades up and down or along the stems, up as they are moving away from each other and down after they have closed on the stems, the downward movement resulting in stripping the leaf from the stems for a distance equal to the stroke of the cranks 11. As the crossheads 13 ascend and descend, the spiral gears 24 move up and down on the elongated spiral gears 28, the downward movement neutralizing the turning effect of the spiral gears 27, and the upward movement doubling that effect, so that the spiral gears 24 stop rotating on the down stroke, thus leaving the blades in dwell around the stems while stripping, but rotate at double speed on the up stroke, causing a rapid opening, advancing, and closing movement of the blades. As designed, the cycle of stripping operation is twice as fast as the cycle of operation of the machine as a whole.

To guide the crossheads 13 in their reciprocating movement, they are provided with rollers 33 and 34, the former fitting between the sides, and the latter bearing against the faces, of two vertical guide bars 35 attached to the bearings 7 before referred to.

The crossheads 13 have the lugs 36 into which are clamped the round ends of the square blade guides 37, the latter resting on the contact plates 38 attached to the blades, thereby keeping the blades in proper alignment during their horizontal travel.

To prevent the advancing stems from being caught between the points of the blade teeth, a rail 39 extending along the entire length of the blades is attached by means of cleats 40 to the blade guides 37 of one of the blades, and a bar 41 studded with short horizontal brushes 42 set at a forwardly-inclined angle with their points touching the rail 39, is similarly fastened to the blade guides of the other blade. The stems, in moving forward while the blades are open, are thus held by the brushes 42 against the rail 39, the latter being so adjusted that the pressure of the brushes will force the stems into the spaces between the blade teeth.

To prevent scraps or waste material from entering the gear boxes, the crossheads 13 are provided with vertical guards 43 held close to the inner sides of the bearings 7 by means of angles 44 attached to their top surfaces, so as to cover up the openings of the gear housing walls as the crossheads move downwardly. Likewise, the vertical guard plates 45 extending, in the centre space of the stripper, along the entire length of the blades, and supported by the angles 46 attached to the journal caps 47 of the crossheads 13, keep scrap, etc., from entering the crankcases of the crankshafts 10.

The stripped leaf falls upon an endless conveyor belt 48 running from the pulley 49, the shaft 50 of which is supported below the stripping unit on the main frame of the machine, to another pulley suspended on outboard bearings beyond the end of the machine where the stripped leaves are taken off by the machine operator, not shown but of well known construction and operation.

The shaft 50 is driven by the sprocket 51 which, by means of the chain 52, is connected with and driven by the sprocket 53 on the countershaft 54 journaled in the main frame. The countershaft 54 is driven by a spur gear 55 meshing with the gear 56 on the shaft 57, the latter having the wormwheel 58 in mesh with the driving worm 59 on the shaft 6.

In view of the foregoing, a more detailed description of the operation of the mechanism is deemed unnecessary to a full understanding of the invention, and it is therefore omitted in the interest of brevity and clearness.

What is claimed is:

1. The combination with two coacting leaf-stripping members, of means whereby a plurality of stems are simultaneously drawn between said members, and means for producing in rapid succession movements of said members which are the resultants of traveling movements around axes substantially parallel with the stems and of reciprocating movements along the stems to cause said members to repeatedly engage each stem and strip a short section of leaf therefrom.

2. The combination with two coacting multi-notched leaf-stripping blades, of means whereby a plurality of stems are simultaneously drawn between said blades, and means for producing in rapid succession movements of said blades which are the resultants of traveling movements around axes substantially parallel with the stems and of reciprocating movements along the stems to cause said blades to repeatedly engage each stem and strip a short section of leaf therefrom.

3. The combination with two coacting leaf-stripping members, of means whereby a plurality of stems are given movements between said members which are the resultants of endwise movements and sidewise movements, and means for producing in rapid succession movements of said members which are the resultants of traveling movements around axes substantially parallel with the stems and of reciprocating movements along the stems to cause said members to repeatedly engage each stem and strip a short section of leaf therefrom.

4. The combination with two coacting leaf-stripping members, of an upwardly and forwardly running chain having a series of grippers individually holding the stems to draw them lengthwise between said members, and means for producing in rapid succession movements of said members which are the resultants of traveling movements around axes substantially parallel with the stems and of reciprocating movements along the stems to cause said members to repeatedly engage each stem and strip a short section of leaf therefrom.

5. The combination with two coacting leaf-stripping members, of means whereby a plurality of stems are simultaneously drawn between said members, and means for producing in rapid succession movements of said members which are the resultants of horizontal traveling movements around axes substantially parallel with the stems and of vertical reciprocating movements along the stems to cause said members to repeatedly engage each stem and strip a short section of leaf therefrom.

6. The combination with two coacting leaf-stripping members, of means whereby a plurality of stems are simultaneously drawn between said members, and means for producing in rapid succession movements of said members which are the resultants of traveling movements around axes substantially parallel with the stems and of reciprocating movements along the stems to cause said members to repeatedly engage each stem and strip a short section of leaf therefrom, said movement producing means including operative connections and cranks producing said traveling movements.

7. The combination with two coacting leaf-stripping members, of means whereby a plurality of stems are simultaneously drawn between said members, and means for producing in rapid succession movements of said members which are the resultants of traveling movements around axes substantially parallel with the stems and of reciprocating movements along the stems to cause said members to repeatedly engage each stem and strip a short section of leaf therefrom, said movement producing means including operative connections and cranks movable about vertical axes and producing said traveling movements.

8. The combination with two coacting leaf-stripping members, of means whereby a plurality of stems are simultaneously drawn between said members, and means for producing in rapid succession movements of said members which are the resultants of traveling movements around axes substantially parallel with the stems and of reciprocating movements along the stems to cause said members to repeatedly engage and strip a short section of leaf therefrom, said movement producing means including operative connections and cranks producing said movements along the stems.

9. The combination with two coacting leaf-stripping members, of means whereby a plurality of stems are simultaneously drawn between said members, and means for producing in rapid succession movements of said members which are the resultants of traveling movements around axes substantially parallel with the stems and of reciprocating movements along the stems to cause said members to repeatedly engage each stem and strip a short section of leaf therefrom, said movement producing means including operative connections and cranks movable about horizontal axes and producing said movements along the stems.

10. The combination with two coacting leaf-stripping members, of means whereby a plurality of stems are simultaneously drawn between said members, and means for producing in rapid succession movements of said members which are the resultants of traveling movements around axes substantially parallel with the stems and of reciprocating movements along the stems to cause said members to repeatedly engage each stem and strip a short section of leaf therefrom, said movement producing means including operative connections, cranks producing said traveling movements, cranks producing said movements along the stems, and interconnected gearing whereby said cranks are actuated in synchronism.

11. The combination with two coacting leaf-stripping members, of means whereby a plurality of stems are simultaneously drawn between said members, and means for producing in rapid succession movements of said members which are the resultants of traveling movements around axes substantially parallel with the stems and of reciprocating movements along the stems to cause said members to repeatedly engage each stem and strip a short section of leaf therefrom, said movement producing means including operative connections, horizontal crankshafts producing said movements along the stems, vertical transmission shafts geared to said crankshafts, and vertical crankshafts geared to said transmission shafts and longitudinally reciprocated by said horizontal crankshafts and producing said traveling movements.

12. The combination with two coacting leaf-stripping members, of means whereby a plurality of stems are simultaneously drawn between said members, and means for producing in rapid succession movements of said members which are the resultants of traveling movements around axes substantially parallel with the stems and of reciprocating movements along the stems to cause said members to repeatedly engage each stem and strip a short section of leaf therefrom, said movement producing means including operative connections, and means for interrupting said traveling movements during a part of said reciprocating movements.

13. The combination with two coacting leaf-stripping members, of means whereby a plurality of stems are simultaneously drawn between said members, and means for producing in rapid succession movements of said members which are the resultants of traveling movements around axes substantially parallel with the stems and of reciprocating movements along the stems to cause said members to repeatedly engage each stem and strip a short section of leaf therefrom, said movement producing means including operative connections, horizontal crankshafts producing said movements along the stems, vertical transmission shafts geared to said crankshafts, and vertical crankshafts geared to said transmission shafts and longitudinally reciprocated by said horizontal crankshafts and producing said traveling movements, said transmission shafts having elongated spiral gears driving short spiral gears on said vertical crankshafts at double speed during upward reciprocation and stopping them during downward reciprocation.

14. The combination with two coacting leaf-stripping members, of means whereby a plurality of stems are simultaneously drawn between said members, and means for producing in rapid succession movements of said members which are the resultants of traveling movements around axes substantially parallel with the stems and of reciprocating movements along the stems to cause said members to repeatedly engage each stem and strip a short section of leaf therefrom, said movement producing means including operative connections, crossheads supporting said members, means for reciprocating said crossheads along the stems, and vertical crankshafts journaled in said crossheads and producing said traveling movements.

15. The combination with two coacting leaf-stripping members, of means whereby a plurality of stems are simultaneously drawn between said members, and means for producing in rapid succession movements of said members which are the resultants of traveling movements around axes substantially parallel with the stems and of reciprocating movements along the stems to cause said members to repeatedly engage each stem and strip a short section of leaf therefrom, said movement producing means including operative connections, crossheads supporting said members, means for reciprocating said crossheads along the stems, vertical crankshafts journaled in said crossheads and producing said traveling movements, and guard plates carried by said crosshead.

16. The combination with two coacting leaf-stripping members, of means whereby a plurality of stems are simultaneously drawn between said members, means for producing in rapid succession movements of said members which are the resultants of traveling movements around axes substantially parallel with the stems and of reciprocating movements along the stems to cause said members to repeatedly engage each stem and strip a short section of leaf therefrom, and stem-clearing means engaging the stems adjacent said members.

17. The combination with two coacting leaf-stripping members, of means whereby a plurality of stems are simultaneously drawn between said members, means for producing in rapid succession movements of said members which are the resultants of traveling movements around axes substantially parallel with the stems and of reciprocating movements along the stems to cause said members to repeatedly engage each stem and strip a short section of leaf therefrom, and stem-clearing means including a rail and a coacting brush engaging the stems adjacent said members.

18. The combination with two coacting leaf-stripping members, of means whereby a plurality of stems are simultaneously drawn between said members, means for producing in rapid succession movements of said members which are the resultants of traveling movements around axes substantially parallel with the stems and of reciprocating movements along the stems to cause said members to repeatedly engage each stem and strip a short section of leaf therefrom, and stem-clearing means moving with said members and engaging the stems adjacent said members.

In testimony whereof, I have signed my name to this specification.

WILHELM B. BRONANDER.